United States Patent
Motoyama (10) Patent No.: US 10,362,793 B2
(45) Date of Patent: Jul. 30, 2019

(54) MUNG BEAN PROTEIN COMPOSITION

(71) Applicant: FUJI OIL HOLDINGS INC., Osaka (JP)

(72) Inventor: Takayasu Motoyama, Ibaraki (JP)

(73) Assignee: FUJI OIL HOLDINGS INC., Izumisano-Shi, Osaka (JP)

( * ) Notice: Subject to any disclaimer, the term of this patent is extended or adjusted under 35 U.S.C. 154(b) by 0 days.

(21) Appl. No.: 15/110,642

(22) PCT Filed: Jan. 8, 2015

(86) PCT No.: PCT/JP2015/050351
§ 371 (c)(1),
(2) Date: Jul. 8, 2016

(87) PCT Pub. No.: WO2015/105138
PCT Pub. Date: Jul. 16, 2015

(65) Prior Publication Data
US 2016/0324187 A1  Nov. 10, 2016

(30) Foreign Application Priority Data
Jan. 9, 2014 (JP) .................... 2014-002568

(51) Int. Cl.
| A23J 1/14 | (2006.01) |
| A23J 3/14 | (2006.01) |
| A23L 11/00 | (2016.01) |
| A23L 13/40 | (2016.01) |

(52) U.S. Cl.
CPC ............ *A23J 1/14* (2013.01); *A23J 3/14* (2013.01); *A23L 11/05* (2016.08); *A23L 13/426* (2016.08)

(58) Field of Classification Search
None
See application file for complete search history.

(56) References Cited

U.S. PATENT DOCUMENTS

| 4,111,927 A | 9/1978 | Satterlee |
| 2005/0070590 A1 | 3/2005 | Aoki |
| 2008/0286435 A1 | 11/2008 | Fukumori et al. |
| 2010/0143568 A1 | 6/2010 | Quail et al. |

FOREIGN PATENT DOCUMENTS

| CN | 102860406 | 1/2013 |
| GB | 2 095 259 | 9/1982 |
| JP | H6-181718 | 7/1994 |

(Continued)

OTHER PUBLICATIONS

Thompson, L. , "Preparation and evaluation of mung bean protein isolates"—J. Food Sci., vol. 42, 1977, pp. 202-206.*

(Continued)

*Primary Examiner* — Elizabeth Gwartney
(74) *Attorney, Agent, or Firm* — Stephen J. Weyer, Esq.; Stites & Harbison, PLLC (57) ABSTRACT

The present invention aims at providing a mung bean protein composition keeping a good color tone even after subjected to a heat treatment step for sterilization. The present invention provides a heat-treated mung bean protein composition wherein a measurement value according to the Folin-Denis method is 1.39% by weight or less in terms of gallic acid on a dry matter basis.

10 Claims, 2 Drawing Sheets

(56) References Cited

FOREIGN PATENT DOCUMENTS

| JP | H11-206342 | 8/1999 |
| JP | 2011-079755 | 4/2011 |
| WO | WO-2014/156551 | 10/2014 |
| WO | WO-2014/156552 | 10/2014 |

OTHER PUBLICATIONS

Opoku et al., "Conditioning and Dehulling of Pigeon Peas and Mung Beans", CSAE/SCGR 2003 Meeting, Montréal, Québec, Jul. 6-9, 2003, pp. 1-17.*

Sashikala et al., "Effect of thermal processing on protein solubility of green gram (*Phaseolus aureus* legume cultivars"—J. Food Sci. Technol., 52(3), 2015, pp. 1552, 1560.*

Hui, Y. (CN 102715338 A) Oct. 10, 2012, Derwent Abstract only.*

"GRAS Notice for a Mung Bean Protein Isolate"—https://www.fda.gov/downloads/Food/IngredientsPackagingLabeling/GRAS/NoticeInventory/ucm542218.pdf, downloaded Jul. 9, 2018 (Dec. 2016). (Year: 2016).*

Coffmann et al.,"Functional properties and amino acid content of a protein isolate from mung bean flour"—J. Fd. Technol. (1977) 12, pp. 473-484. (Year: 1977).*

Nobuyuki Tsusaka, "Ryokuto ni Kansuru Shokuhin Kagakuteki Kenkyu 1 Ryokuto Tanpakushitsu no Bunri, Seisei", Bulletin of the Faculty of Agriculture, Meiji University, 1984, vol. 67, pp. 51 to 67, entire text, particularly, 'sample and experiment method'.

Hiroshi Endo et al., "Effect of Variety of Soybean Seeds and Processing of Soy Milk on the Isoflavone Content of Tofu", Food Preservation Science, 2003, vol. 29, No. 3, pp. 165 to 172, entire text, particularly, p. 168.

Supplementary European Search Report for EP 15 73 5247, dated Jun. 9, 2017.

English Translation of IPER dated Jul. 12, 2016 in International Application No. PCT/JP2015/050351.

English Translation of Written Opinion dated Apr. 14, 2015 in International Application No. PCT/JP2015/050351.

Chinese Office Action dated Apr. 3, 2019 in corresponding Chinese Patent Application No. 201580003818.1.

\* cited by examiner

MUNG BEAN PROTEIN COMPOSITION

TECHNICAL FIELD

The present invention relates to a mung bean protein composition having a good color tone.

BACKGROUND ART

The mung bean (the seed of *Vigna radiata*) is a seed with a high physiological function, which is considered as one of the traditional Chinese medicine herbs for soothing inflammations in China, and widely eaten in China and Southeast Asia.

The mung bean is generally eaten in the form of a sweet soup of mung beans boiled and sweetened in Asian countries including China, and generally eaten in the form of mung bean sprouts in Japan. The starch isolated from mung beans is used as an ingredient for mung bean thread noodles.

The mung bean protein is not considered as a major food allergen, and thus is a very useful food product as a protein source. The mung bean protein is discharged in large quantities as a by-product of the mung bean starch, and there are some reported cases of mung bean protein in papers and the like. However, the mung bean protein is not widely used in food applications. The reason for this is believed to be that the mung bean protein has been positioned as a by-product of the mung bean starch heretofore, and has been mainly used for livestock feed; it has not been fully studied for food applications.

Patent Literature 1 discloses that the study was made on a liquid diet using the mung bean milk. In the study, a method including soaking beans as a raw material, and thereafter extracting the mung bean milk was used as in common manufacturing methods, and furthermore, heat sterilization was conducted, as described therein. Patent Literature 2 describes the preparation and pulverization of the mung bean protein from mung beans. Non Patent Literatures 1 and 2 describe the preparation methods and analysis results for the mung bean protein.

CITATION LIST

Patent Literature

Patent Literature 1: JP h06-181718 A
Patent Literature 2: U.S. Pat. No. 4,111,927

Non Patent Literature

Non Patent Literature 1: Journal of Food Science. 42, 202-206, 1977
Non Patent Literature 2: Plant Foods for Human Nutrition. 37, 17-27, 1987

SUMMARY OF INVENTION

Technical Problem

In a conventional manufacturing method of the mung bean milk such as the manufacturing method described in Patent Literature 1, when a heat sterilization step essential for food processing is conducted, the product exhibits a black color (dark color), which is inappropriate for a food product, thus problematic. A solution to this problem has not been obtained so far.

A mung bean protein isolate powder described in Patent Literature 2 is used without sterilization. For this reason, it cannot be valued as a practical food product. Literatures such as Non Patent Literatures 1 and 2 disclose that lyophilization was basically used for a method of pulverizing the mung bean protein, and a heat sterilization step considering practical food manufacturing is not at all studied. Thus, in regard to a mung bean protein isolate which has been subjected to a heat sterilization step, a mung bean protein composition having a good color tone has not yet been obtained.

The present invention aims at providing a mung bean protein composition keeping a good color tone even after subjected to a heat treatment step for sterilization essential in food processing. The present invention also aims at providing a mung bean protein food product employing the protein composition.

Solution to Problem

The present inventor has conducted diligent research on the above problem, and found that the content of a certain component has an influence on the color tone of the mung bean protein after heat sterilization, thus completed this invention.

That is, the present invention provides a heat-treated mung bean protein composition wherein a measurement value according to the Folin-Denis method is 1.39% by weight or less in terms of gallic acid on a dry matter basis. It is preferred that an iron content of the mung bean protein composition be 105 ppm or less on a dry matter basis.

It is preferred that an $L^*$ value of a 10 wt. % aqueous solution (suspension) of the mung bean protein composition be 60 or more and that an $a^*$ value thereof be $-4.0$ or less.

It is preferred that a crude protein content on a dry matter basis of the mung bean protein composition be 60% by weight or more, more preferably 80% by weight or more.

Advantageous Effects of Invention

According to the present invention, a mung bean protein composition can be obtained which keeps a good color tone even after subjected to a heat treatment. Thus, when the composition of the present invention is used in a common food product, a good colored food product can be obtained. Furthermore, when the composition of the present invention is used in a protein beverage, a good colored beverage can be obtained.

BRIEF DESCRIPTION OF DRAWINGS

FIG. 1(*a*) is a graph showing a DSC measurement result for the mung bean protein composition untreated with heat; FIG. 1(*b*) is a graph showing a DSC measurement result for the heat-treated mung bean protein composition.

FIG. 2(*a*) is a graph showing a relationship between the Folin-Denis measurement value and the $L^*$ value of the mung bean protein composition; FIG. 2(*b*) is a graph showing a relationship between the iron content and the $L^*$ value of the mung bean protein composition.

DESCRIPTION OF EMBODIMENTS

Preferred embodiments of the present invention will be described hereinafter. However, the present invention is not limited to the following embodiments.

(Mung bean protein composition) The mung bean protein composition can be obtained from a mung bean protein source as a raw material. As the mung bean protein source, a mung bean protein material containing the mung bean protein can be utilized. As the mung bean protein material, mung bean milk, destarched mung bean milk, mung bean protein isolates or the like can be used. These may be used as they are, or they may be used after dried, or may be used after sterilized, and dried.

The mung bean milk and destarched mung bean milk can be obtained by extracting the protein component from whole mung beans with water or hot water, and removing the starch and dietary fiber components from the extract solution. It is preferred that dehusked whole mung bean which is a husk is removed from whole mung bean after soaking, or whole mung beans already dehusked before soaking, or the like be used as whole mung beans. Also, the protein component of the mung bean milk may be concentrated by a treatment with a UF membrane (ultrafiltration membrane) or the like. The mung bean protein isolate can be obtained by concentrating the protein from the mung bean milk by a treatment such as isoelectric point precipitation.

The CP (crude protein content) of the obtained mung bean protein composition is preferably 60% by weight or more based on a total amount of the solid content of the mung bean protein composition in view of improving its flavor, and increasing the nutritional value coming from the protein, and more preferably 80% by weight or more. Therefore, it is preferred that whole mung beans or dehusked whole mung beans with high protein contents be used as whole mung beans or dehusked whole mung beans for a raw material of the mung bean protein material.

The mung bean protein isolate can be prepared as follows, for example. Water or hot water is added to whole mung beans, followed by soaking for about 10 hours to 30 hours, fully removing the husks, crushing, extraction at around a neutral pH, and removing fibers using a mesh. Alternatively, water or hot water is added to mung beans previously dehusked, followed by soaking for about 1 hour to 3 hours, crushing, extraction at around a neutral pH, and removing fibers using a mesh. Subsequently, the starch is isolated by natural sedimentation or using a separator to give the mung bean milk. Next, the mung bean milk is adjusted to a pH of around 3.5 to 5.5, and the isoelectric point precipitate is collected as the mung bean protein isolate. Water and an alkaline agent are added to the obtained isoelectric point precipitate (mung bean protein isolate) to adjust it to a neutral pH range. At this time, the concentration of the aqueous solution of the mung bean protein isolate is adjusted preferably such that the solid content becomes 5 to 15% by weight. It is preferred that the solution be adjusted to a pH of 6.0 to 8.0, and more preferably to a pH range of 6.5 to 7.5. When the pH is 6.0 or more, the solubility of the mung bean protein in water improves. Also, when the pH is 8.0 or less, its flavor is favorable since the occurrence of an alkaline smell due to the subsequent heat treatment can be suppressed, and furthermore, the color tone can be kept better. Examples of the alkaline agent used for neutralization include sodium hydroxide and potassium hydroxide, which can be used in food applications.

(Suppression of the blackening of the mung bean protein composition) The inventors of this application have found that the blackening (darkening) of the mung bean protein composition is caused by heating the mung bean protein composition under a condition where reductive materials localizing in the husk of the mung bean and iron ions distributed throughout the seed are concurrently present. In other words, the present inventors consider that even when a heat treatment is conducted, the blackening is not caused under a condition where either the reductive materials or iron ions are present alone. Accordingly, the blackening of the mung bean protein composition can be suppressed by removing the reductive materials from the mung bean protein composition to a certain degree. It is preferred that both the reductive materials and irons be removed to a certain degree for a better color tone of the obtained mung bean protein composition.

As for a specific method for obtaining a mung bean protein composition with a lowered content of the reductive materials, it can be obtained by, for example, but not limited to, extracting the mung bean protein composition using mung beans with husks removed. When a mung bean protein composition extracted from a mung bean which is not dehusked is used, the reductive materials content in the mung bean protein composition can be lowered by passing the extracted mung bean protein composition through a hydrophobic column before heat sterilization, for example. The mung bean protein composition thus obtained can keep a good color tone even when a heat treatment for sterilization is conducted.

The mung bean protein composition may be one with a decreased iron content. The iron content of the mung bean protein composition can be lowered by extracting a mung bean protein composition using mung beans with husks removed. When a mung bean protein composition extracted from a mung bean which is not dehusked is used, the iron ions content in the mung bean protein composition can be lowered by, e.g., passing the extracted mung bean protein composition through an ion exchange membrane before heat sterilization.

In the case of using mung beans with husks removed, the husks may be removed enough to obtain a mung bean protein composition having a desired content of or less of the reductive materials. It is preferable to remove 90% or more of the husks, more preferable to remove 95% or more of the husks, and further preferable to remove 99% or more of the husks are removed.

As used herein, a reductive material refers to a material having a phenolic hydroxyl group which can be measured according to the Folin-Denis method, and the content of the reductive materials is measured using gallic acid as a standard material and expressed in terms of gallic acid. It is preferred that the reductive materials in the mung bean protein composition be 1.39% by weight or less, more preferably 1.25% by weight or less, and further preferably 1.15% by weight or less on a dry matter of the mung bean protein composition basis.

When the iron content of the mung bean protein composition is decreased, iron ions to be removed may be bivalent or trivalent. It is preferred that the iron content be lowered to 105 ppm by weight or less, more preferably to 97 ppm by weight or less, based on the dry matter of the mung bean protein composition.

(Heat treatment) The mung bean protein composition in this embodiment has been heat-treated in part or whole thereof. Therefore, the part or whole of the mung bean protein in the mung bean protein composition has been heat-denatured.

The heat-treated mung bean protein composition according to this embodiment can be obtained by, e.g., heating a solution containing the mung bean protein composition. For the condition of the heat treatment, the heating temperature is preferably in the range of 80° C. to 160° C., and more preferably in the range of 110° C. to 150° C. The heating time is preferably in the range of 2 seconds to 60 minutes, more preferably in the range of 5 seconds to 3 minutes, and further preferably in the range of 5 seconds to 15 seconds. It is particularly preferred that the heating temperature is in the range of 110 to 150° C. and that the heating time is 5 seconds to 15 seconds. The heating method may be any of an indirect heating method or a direct heating method. Of these, it is preferred that a continuous direct heating sterilizer be used, which directly blows high-temperature, high-pressure steam into the solution containing the mung bean protein composition to thereby heat and maintain it at a high temperature, and then suddenly releases the pressure in the vacuum flash pan, in view of improving the color tone of the mung bean protein composition after a heat treatment.

The mung bean protein composition obtained by the above method can be made into a powder. When the mung bean protein composition is made into a powder, it is easily dispersed in a liquid, and thus preferable for working when used in food and beverages. It is also preferable in a food hygiene viewpoint, since the bacterial growth can be suppressed, and furthermore, the transportation cost can also be suppressed. As a pulverizing method, a method involving drying with a spray dryer is preferable in view of the product quality and manufacturing costs. As the spray drying method, disc atomizer system, single- or two-fluid nozzle spray drying, or the like can be employed.

The mung bean protein composition according to this embodiment includes the heat-treated protein composition derived from mung beans, and may further include a protein derived from other than mung beans, such as soy protein or milk protein, and it may also include an ingredient such as an oil and fat, or an emulsifier.

The mung bean protein composition in a liquid state having a good color tone can be obtained by suspending the mung bean protein composition obtained by the above-mentioned method in water. For example, in the case of a suspension where the content of the mung bean protein composition is 10% by weight based on the total weight, the L* value is preferably 60 or more, more preferably 65 or more, and further preferably 70 or more, as measured by a colorimeter (Color meter ZE6000: manufactured by Nippon Denshoku Industries Co., Ltd.). Also, it is preferred that the a* value be −2 or less, more preferably −3 or less, and further preferably −4 or less. It is preferred that the a* value be −8 or more. It is noted that the L* value (lightness) is an index used for expressing the color tone of an object to be measured according to the L*a*b* color space, indicating that as the value approaches 100, the whiteness gets larger. Also, a higher a* value indicates a redder color, and a lower a* value indicates a greener color.

The mung bean protein composition obtained by the above method exhibits a good color tone, and thus can be applied in various food and beverages. For example, it can be applied in various forms of food and beverages such as thick liquid diets, tablets, food bars, meat products, fish paste products, oil-in-water emulsions, water-in-oil emulsions, margarine, snack foods, desserts, confectioneries, dietary supplements and beverages.

As a method for measuring the content of mung bean protein contained in a food product, Western blotting can be used, for example. That is, a sample buffer containing SDS and a reducing agent such as 2-mercaptoethanol is added to a liquid or a triturated sample to be measured, and the protein is extracted in boiled water for 10 minutes. Subsequently, SDS-PAGE is conducted using mung bean proteins (controls) adjusted to several concentrations at the same time with the sample, and the proteins are transferred to a PVDF (Polyvinylidene difluoride) membrane by a semi-dry method. An anti-mung bean protein antibody as primary antibody is reacted on the transferred membrane, and an antibody labeled with AP (Alkaline phosphatase), HRP (Horseradish peroxidase), or the like used as secondary antibody is reacted with the primary antibody. The mung bean protein can be thus detected and quantified by color development by the enzyme activity or the like.

Whether mung bean protein has been heat-denatured or is undenatured can be analyzed with a differential scanning calorimeter (DSC). A protein in a protein composition generally has a three-dimensional structure in the undenatured state, and the three-dimensional structure is disrupted by heating, denaturing the protein. A calorie change occurs in denaturation, and an endothermic peak is detected. In the case of mung bean protein in the undenatured state, heat-denaturation occurs at about 72° C., and an endothermic peak is generated. On the other hand, no endothermic peak is observed in fully heated mung bean protein, and thus whether mung bean protein has been heat-treated or not can be determined.

EXAMPLES

The embodiments of this invention will be specifically described hereinafter by Examples, but the present invention is not limited to the following Examples.

Preparation Example 1

To 10 parts by weight of water, was added 1 part by weight of crushed mung beans with husks, followed by extraction at 50° C. for 30 minutes with stirring using a homogenizing mixer (manufactured by Tokushu Kika Kogyo Co., Ltd.), and centrifugation at 3,000×g to remove the starch and okara (mung bean residue), thereby giving mung bean milk. The resulting mung bean milk was directly spray dried with a spray dryer (manufactured by Okawara Mfg. Co., Ltd.) to give a mung bean protein composition A in powder form without heat treatment. Also, the mung bean milk was heated at 120° C. for 10 seconds using a continuous direct heating sterilizer (hereinafter denoted as VTIS) (manufactured by Alfa Laval Corporation AB), and the resulting solution was spray dried with the spray dryer to give a heat-treated mung bean protein composition B (Comparative Example 1) in powder form.

Preparation Example 2

To 10 parts by weight of water, was added 1 part by weight of dehusked and crushed mung beans, followed by extraction at 50° C. for 30 minutes with stirring using the homogenizing mixer, and centrifugation at 3,000×g to remove the starch and okara, thereby giving mung bean milk. The resulting solution was directly spray dried with the spray dryer to give a mung bean protein composition C in powder form without heat treatment. Also, the mung bean milk was heated at 120° C. for 10 seconds using the VTIS, and the resulting solution was spray dried with the spray dryer to give a heat-treated mung bean protein composition D (Example 1) in powder form.

Preparation Example 3

To 10 parts by weight of water, was added 1 part by weight of crushed mung beans with husks, followed by extraction at 50° C. for 30 minutes with stirring using the homogenizing mixer, and centrifugation at 3,000×g to remove the starch and okara, thereby giving mung bean milk. This was adjusted to a pH of 4.5 with hydrochloric acid for isoelectric point precipitation, followed by centrifugation to give an acid-precipitated curd. To this acid-precipitated curd, was added 4 times its volume of water, and the resultant was adjusted to a pH of 7.0 with sodium hydroxide to give a solution containing a mung bean protein isolate. The resulting solution was directly spray dried with the spray dryer to give a mung bean protein composition E in powder form without heat treatment. Also, the mung bean milk was heated at 120° C. for 10 seconds using the VTIS, and the resulting solution was spray dried with the spray dryer to give a heat-treated mung bean protein composition F (Comparative Example 2) in powder form.

Preparation Example 4

To 10 parts by weight of water, was added 1 part by weight of dehusked and crushed mung beans, followed by extraction at 50° C. for 30 minutes with stirring using the homogenizing mixer, and centrifugation at 3,000×g to remove the starch and okara, thereby giving mung bean milk. This was adjusted to a pH of 4.5 with hydrochloric acid for isoelectric point precipitation, followed by centrifugation to give an acid-precipitated curd. To this acid-precipitated curd, was added 4 times its volume of water, and the resultant was adjusted to a pH of 7.0 with sodium hydroxide to give a solution containing a mung bean protein isolate. The resulting solution was directly spray dried with the spray dryer to give a mung bean protein composition G in powder form without heat treatment. Also, the mung bean milk was heated at 120° C. for 10 seconds using the VTIS, and the resulting solution was spray dried with the spray dryer to give a heat-treated mung bean protein composition H (Example 2) in powder form.

Preparation Example 5

To 3 parts by weight of water, was added 1 part by weight of whole mung beans, followed by soaking for 22 hours, milling using a colloid mill (manufactured by Tokushu Kika Kogyo Co., Ltd.), adjusting the pH to 8.5, and then extraction at 50° C. for 30 minutes with stirring using the homogenizing mixer, and centrifugation at 3,000×g to remove insoluble matter, thereby obtaining destarched mung bean milk. The obtained destarched mung bean milk was adjusted to a pH of 4.5 with hydrochloric acid for isoelectric point precipitation, followed by centrifugation to give a precipitate as an acid-precipitated curd. To this acid-precipitated curd, was added 4 times its volume of water, and the resultant was adjusted to a pH of 7.0 with sodium hydroxide to give a solution containing a mung bean protein isolate. The obtained solution containing a mung bean protein isolate was heated at 120° C. for 10 seconds using the VTIS, and the resulting solution was spray dried with the spray dryer to give a heat-treated mung bean protein composition I (Comparative Example 3) in powder form.

Preparation Example 6

To 3 parts by weight of water, was added 1 part by weight of whole mung beans, followed by soaking for 22 hours, removing the soaking water, then separating about 50% or more of the husks, milling the remainder using the colloid mill, adjusting the pH to 8.5, and then extraction at 50° C. for 30 minutes with stirring using the homogenizing mixer, and centrifugation at 3,000×g to remove insoluble matter, thereby obtaining destarched mung bean milk. The obtained destarched mung bean milk was adjusted to a pH of 4.5 with hydrochloric acid for isoelectric point precipitation, followed by centrifugation to give a precipitate as an acid-precipitated curd. To this acid-precipitated curd, was added 4 times its volume of water, and the resultant was adjusted to a pH of 7.0 with sodium hydroxide to give a solution containing a mung bean protein isolate. The obtained solution containing a mung bean protein isolate was heated at 120° C. for 10 seconds using the VTIS, and the resulting solution was spray dried with the spray dryer to give a heat-treated mung bean protein composition J (Comparative Example 4) in powder form.

Preparation Example 7

To 3 parts by weight of water, was added 1 part by weight of whole mung beans, followed by soaking for 22 hours, removing the soaking water, then separating about 95% or more of the husks, milling the remainder using the colloid mill, adjusting the pH to 8.5, and then extraction at 50° C. for 30 minutes with stirring using the homogenizing mixer, and centrifugation at 3,000×g to remove insoluble matter, thereby obtaining dehusked-mung bean milk. The obtained destarched mung bean milk was adjusted to a pH of 4.5 with hydrochloric acid for isoelectric point precipitation, followed by centrifugation to give a precipitate as an acid-precipitated curd. To this acid-precipitated curd, was added 4 times its volume of water, and the resultant was adjusted to a pH of 7.0 with sodium hydroxide to give a solution containing a mung bean protein isolate. The obtained solution containing a mung bean protein isolate was heated at 120° C. for 10 seconds using the VTIS, and the resulting solution was spray dried with the spray dryer to give a heat-treated mung bean protein composition K (Example 3) in powder form.

Preparation Example 8

To 3 parts by weight of water, was added 1 part by weight of whole mung beans, followed by soaking for 22 hours, removing the soaking water, then separating about 99% or more of the husks, milling the remainder using the colloid mill, adjusting the pH to 8.5, and then extraction at 50° C. for 30 minutes with stirring using the homogenizing mixer, and centrifugation at 3,000×g to remove insoluble matter, thereby obtaining dehusked-mung bean milk. The obtained destarched mung bean milk was adjusted to a pH of 4.5 with hydrochloric acid for isoelectric point precipitation, followed by centrifugation to give a precipitate as an acid-precipitated curd. To this acid-precipitated curd, was added 4 times its volume of water, and the resultant was adjusted to a pH of 7.0 with sodium hydroxide to give a solution containing a mung bean protein isolate. The obtained solution containing a mung bean protein isolate was heated at 120° C. for 10 seconds using the VTIS, and the resulting solution was spray dried with the spray dryer to give a heat-treated mung bean protein composition L (Example 4) in powder form.

TABLE 1

| Mung bean protein composition | | | Husk | Raw material | Heat treatment |
|---|---|---|---|---|---|
| A | Preparation Example 1 | | With husks | Mung bean milk | Unheated |
| B | | Comparative Example 1 | With husks | | Heat-treated |
| C | Preparation Example 2 | | Without husks | | Unheated |
| D | | Example 1 | Without husks | | Heat-treated |
| E | Preparation Example 3 | | With husks | Mung bean milk isolate | Unheated |
| F | | Comparative Example 2 | Withhusks | | Heat-treated |
| G | Preparation Example 4 | | Without husks | | Unheated |
| H | | Example 2 | Without husks | | Heat-treated |
| I | Preparation Example 5 | Comparative Example 3 | With husks | | Heat-treated |
| J | Preparation Example 6 | Comparative Example 4 | 50% removed | | Heat-treated |
| K | Preparation Example 7 | Example 3 | 95% removed | | Heat-treated |
| L | Preparation Example 8 | Example 4 | 99% removed | | Heat-treated |

With respect to each of the mung bean protein compositions obtained in Preparation Examples, the moisture content, CP (crude protein content), pH, iron content on a dry matter basis, Folin-Denis measurement value on a dry matter basis, L* value, a* value, and b* value were measured and analyzed according to the following methods.

(DM) The dry matter percentage (DM) (% by weight) is calculated according to the following equation.

DM=(the weight of the protein composition after drying at 105° C. for 4 hours)/(the weight of the protein composition before drying))*100

(Crude protein content) Using the protein compositions dried at 105° C. for 12 hours, the amounts of nitrogen are measured according to the Kjeldahl method. The amounts of nitrogen measured are multiplied by the nitrogen factor 6.25 to obtain the crude protein contents (CP), which are represented in % by weight based on the total solid contents of the protein compositions.

(pH) The pH of a 10 wt. % aqueous solution of each of the protein compositions are measured.

(Iron content) Iron contents are measured using an X-ray fluorescence spectrometer, and then divided by their DMs to obtain iron contents on a dry matter basis.

(Folin-Denis measurement method) To 0.5 g of each of the protein compositions weighed and transferred to a beaker, is added 80 ml of ultrapure water, and the composition is fully dissolved. The dissolved protein composition is transferred to a 100-ml volumetric flask, and diluted up to the marking. To a test tube, is added 100 µl of the resulting aqueous sample solution. To the test tube, is added 500 µl of a phenol reagent (manufactured by Merck KGaA) diluted 2-fold, and the resultant is fully mixed under stirring. Next, 500 µl of 20% aqueous solution of sodium carbonate (Kishida Chemical Co., Ltd.) is added to the test tube, and fully mixed under stirring. The aqueous sample solution mixed with the reagent is allowed to stand still at room temperature for 20 minutes, then 200 µl thereof is added to a 96-well microplate, and absorbance at a wavelength of 700 nm is measured. Gallic acid is used as the standard material. The measurement value calculated in terms of gallic acid is divided by the DM of each of the protein compositions to obtain a Folin-Denis measurement value on a dry matter basis.

(Color Tone) To 10 g of each of the protein composition weighed, is added 90 ml of distilled water, and the resultant is mixed under stirring using a juicer-mixer for 1 minute, thereby preparing a 10 wt. % aqueous solution of the protein composition. Subsequently, each of the aqueous solutions of the protein compositions is transferred to a centrifuge tube, and defoamed by centrifugation using a centrifugal separator (manufactured by Kokusan Co. Ltd.) at 2500 rpm for 10 minutes. The L*a*b* value (JIS Z 8729) of each of the defoamed aqueous solution of the protein compositions is measured using a colorimeter (Color meter ZE6000: manufactured by Nippon Denshoku Industries Co., Ltd.).

(DSC Measurement) A 5% aqueous solution of each of the protein compositions is prepared, filled in a sample container, and the container is capped and crimped with a sample sealer. Subsequently, it is set to DSC220 (manufactured by Seiko Instruments Inc.), ultrapure water is filled as reference, and a program for increasing the temperature from 40° C. to 100° C. at 1° C. per minute is prepared and conducted.

The moisture contents, CPs (crude protein contents), pHs, iron contents on a dry matter basis, Folin-Denis measurement values on a dry matter basis and color tones of the mung bean protein compositions A to H obtained in Preparation Examples 1 to 4 are shown in Table 2.

TABLE 2

| Mung bean protein composition | DM (%) | CP (% by weight) | pH | Folin-Denis measurement value (% by weight) | Iron content (ppm) | | Color tone | | |
|---|---|---|---|---|---|---|---|---|---|
| | | | | | | | L* | a* | b* |
| A | 92.1 | 62.3 | 6.98 | 1.55 | 58.8 | Unheated | 66.3 | −5.1 | 19.6 |
| B (Comparative Example 1) | | | | | | Heated | 48.6 | −2.9 | 10.0 |

TABLE 2-continued

| Mung bean protein composition | DM (%) | CP (% by weight) | pH | Folin-Denis measurement value (% by weight) | Iron content (ppm) | | Color tone L* | a* | b* |
|---|---|---|---|---|---|---|---|---|---|
| C | 94.8 | 61.41 | 7.01 | 0.99 | 50.5 | Unheated | 65.8 | −5.7 | 10.3 |
| D (Example 1) | | | | | | Heated | 68.1 | −6.5 | 8.6 |
| E | 93.7 | 82.3 | 7.10 | 1.87 | 107 | Unheated | 57.3 | −2.2 | 16.9 |
| F (Comparative Example 2) | | | | | | Heated | 45.9 | −1.1 | 7.7 |
| G | 94.6 | 85.5 | 7.06 | 1.10 | 88 | Unheated | 76.2 | −3.8 | 23.8 |
| H (Example 2) | | | | | | Heated | 73.6 | −5.1 | 22.3 |

With respect to the mung bean protein composition A obtained by spray drying without heat treatment with a Folin-Denis measurement value on a dry matter basis of 1.55% by weight and an iron content on a dry matter basis of 58.8 ppm, the color tone of the 10 wt. % aqueous solution was satisfactory with an L* value of 66.3 and an a* value of −5.1. On the other hand, the mung bean protein composition B (Comparative Example 1) obtained by spray drying after heat-treating the same mung bean milk exhibited a black color (dark color) which is not appropriate for a food product, where the color tone largely deteriorated with an L* value of 48.6 and an a* value of −2.9.

The mung bean protein composition C obtained by spray drying without heat treatment with a Folin-Denis measurement value on a dry matter basis of 0.99% by weight and an iron content on a dry matter basis of 50.5 ppm exhibited almost the same color tone as that of the mung bean protein composition A, where the color tone of the 10 wt. % aqueous solution had an L* value of 65.8 and an a* value of −5.7. The mung bean protein composition D (Example 1) obtained by spray drying after heat-treating the same mung bean milk had an L* value of 68.1 and an a* value of −6.5, and maintained the good color tone similar to that of the composition untreated with heat. A mung bean protein composition maintaining a good color tone even when heat-treated, and made from mung bean milk as above, has not existed heretofore.

With respect to the mung bean protein composition E obtained by spray drying without heat treatment with a Folin-Denis measurement value on a dry matter basis of 1.87% by weight and an iron content on a dry matter basis of 107 ppm, the color tone was unsatisfactory even when untreated with heat, where the color tone of the 10 wt. % aqueous solution had an L* value of 57.3 and an a* value of −2.2. The mung bean protein composition F obtained by spray drying the same mung bean protein isolate after heat treatment exhibited a black color (dark color) which is not appropriate for a food product, where the color tone of the 10 wt. % aqueous solution further deteriorated with an L* value of 45.9 and an a* value of −1.1.

The mung bean protein composition G obtained by spray drying without heat treatment with a Folin-Denis measurement value on a dry matter basis of 1.10% by weight and an iron content on a dry matter basis of 88 ppm exhibited a good color tone where the color tone of the 10 wt. % aqueous solution had an L* value of 76.2 and an a* value of −3.8. Furthermore, the mung bean protein composition H obtained by spray drying the same mung bean protein isolate after heat treatment exhibited a very good color tone with an L* value of 70.9 and an a* value of −5.1. A mung bean protein composition maintaining a good color tone even after heat treatment, made from a mung bean protein isolate as above, has not existed heretofore.

Figure 1:
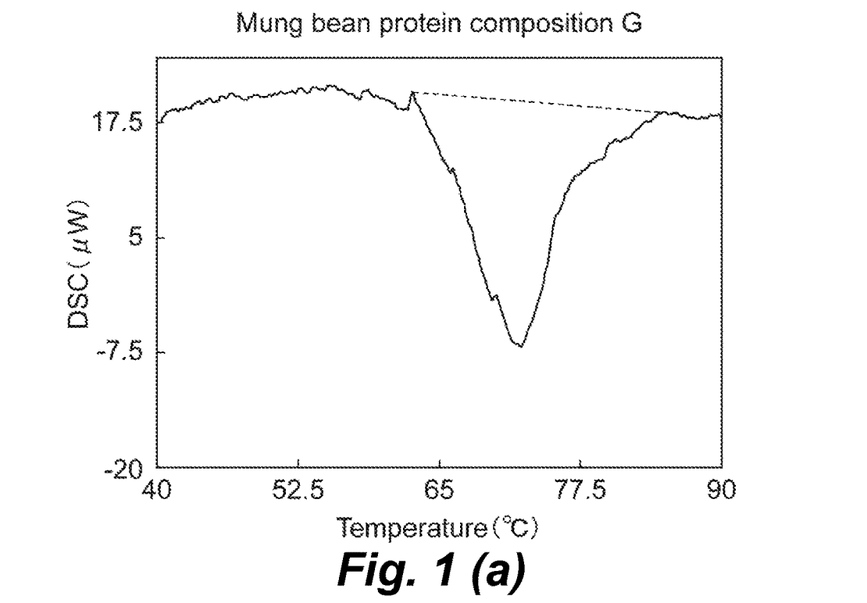

FIG. 1 and Table 3 show the results of analyzing the mung bean protein compositions G and H obtained in Preparation Example 4 using a differential scanning calorimetric analyzer (DSC).

TABLE 3

| Mung bean protein composition | Denaturation starting temperature (° C.) | Denaturation temperature (° C.) | Denaturation ending temperature (° C.) | Enthalpy change (mJ/mg) |
|---|---|---|---|---|
| G | 63.4 | 72.2 | 84.5 | 0.3 |
| H | — | — | — | — |

When the mung bean protein compositions G and H were measured using the DSC, an endothermic peak was observed around about 72° C. for the mung bean protein composition G which had not subjected to heat treatment. On the other hand, no endothermic peak was detected for the mung bean protein composition H spray dried after heat treatment. From the above, it was confirmed that whether a mung bean protein composition has been heat-treated can be determined using DSC.

The moisture contents, CPs (crude protein contents), pHs, iron contents on a dry matter basis, Folin-Denis measurement values on a dry matter basis and color tones of the mung bean protein compositions H to L obtained in Preparation Examples 4 to 8 are shown in Table 4.

TABLE 4

| Mung bean protein composition | DM (%) | CP (% by weight) | pH | Folin-Denis measurement value (% by weight) | Iron content (ppm) | Color tone L* | a* | b* |
|---|---|---|---|---|---|---|---|---|
| I (Comparative Example 3) | 90.5 | 86.1 | 6.96 | 1.88 | 153 | 42.5 | −0.8 | 7.6 |

TABLE 4-continued

| Mung bean protein composition | DM (%) | CP (% by weight) | pH | Folin-Denis measurement value (% by weight) | Iron content (ppm) | Color tone | | |
|---|---|---|---|---|---|---|---|---|
| | | | | | | L* | a* | b* |
| J (Comparative Example 4) | 93.7 | 82.3 | 7.10 | 1.53 | 107 | 57.4 | −1.7 | 15.0 |
| K (Example 3) | 95.0 | 81.3 | 6.92 | 1.12 | 98 | 65.7 | −4.4 | 13.2 |
| L (Example 4) | 94.7 | 78.7 | 6.97 | 1.04 | 96 | 70.1 | −4.7 | 15.7 |
| H (Example 2) | 94.6 | 85.5 | 7.06 | 1.10 | 88 | 73.6 | −5.1 | 22.3 |

Figure 2:
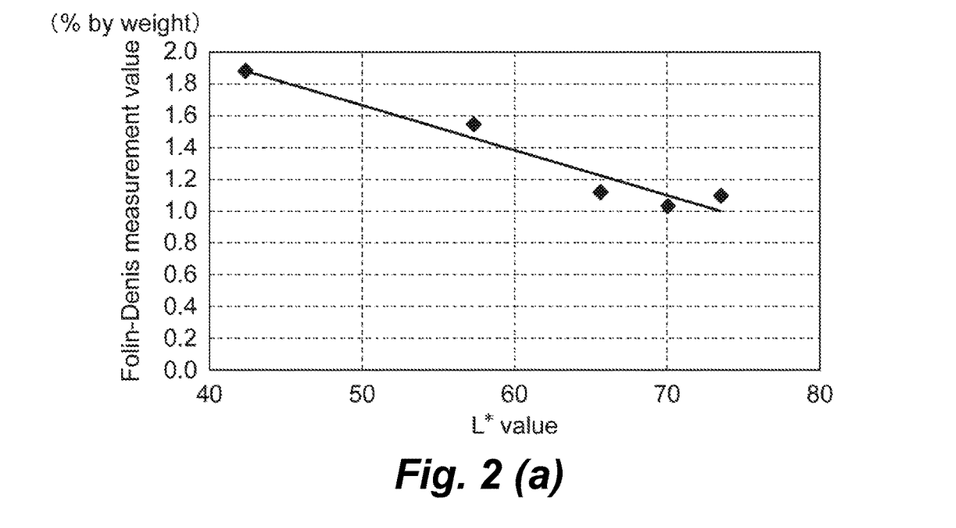

The regression line was calculated with the Folin-Denis measurement value as the ordinate and the L* value as the abscissa (FIG. 2), the following equations were obtained.

$$Y=-0.0286X+3.104$$

Y=the Folin-Denis measurement value
X=the L* value of the 10 wt. % aqueous solution It was confirmed that for the L* value of the 10 wt. % aqueous solution to be 60 or more, it is required that the Folin-Denis measurement value on a dry matter basis is 1.39% by weight or less, and for the L* value of the 10 wt. % aqueous solution to be 65 or more, it is required that the Folin-Denis measurement value on a dry matter basis is 1.25% by weight or less (Table 5).

When the quadratic regression curve was calculated with the iron content as the ordinate and the L* value as the abscissa (FIG. 2), the following approximate equations were obtained.

$$Y=0.0531X^2-8.1316X+401.93$$

Y=the iron content
X=the L* value of the 10 wt. % aqueous solution

When the L* value of the 10 wt. % aqueous solution is 60 or more, the iron content on a dry matter basis was 105 ppm or less, and when the L* value of the 10 wt. % aqueous solution is 65 or more, the iron content on a dry matter basis was 97 ppm or less (Table 5).

TABLE 5

| L* value | Folin-Denis measurement value (% by weight) | Iron content (ppm) |
|---|---|---|
| 60 | 1.39 | 105 |
| 65 | 1.25 | 98 |
| 70 | 1.10 | 93 |

The invention claimed is:

1. A method of producing a mung bean protein powder composition having a measurement value according to the Folin-Denis method of 1.39% by weight or less in terms of gallic acid on a dry matter basis, the method comprising:
   extracting mung bean protein from the mung bean of which 90% or more of husk is removed;
   heat-treating a solution comprising the mung bean protein at 120° C. to 160° C. for 2 seconds to 60 minutes; and
   spray drying the heat-treated solution.

2. The method of producing a mung bean protein composition according to claim 1, wherein the measurement value according to the Folin-Denis method of the mung bean protein composition is 1.25% by weight or less in terms of gallic acid on a dry matter basis.

3. The method of producing a mung bean protein composition according to claim 1, wherein an L* value of a 10 wt. % aqueous solution of the composition is 60 or more, and an a* value of the 10 wt. % aqueous solution of the composition is −2.0 or less.

4. The method of producing a mung bean protein composition according to claim 1, wherein an L* value of a 10 wt. % aqueous solution of the composition is 60 or more, and an a* value of the 10 wt. % aqueous solution of the composition is −4.0 or less.

5. The method of producing a mung bean protein composition according to claim 1, wherein an L* value of a 10 wt. % aqueous solution of the composition is 65 or more, and an a* value of the 10 wt. % aqueous solution of the composition is −2.0 or less.

6. The method of producing a mung bean protein composition according to claim 1, wherein an L* value of a 10 wt. % aqueous solution of the composition is 65 or more, and an a* value of the 10 wt. % aqueous solution of the composition is −4.0 or less.

7. The method of producing a mung bean protein composition according to claim 1, wherein an iron content of the composition is 105 ppm or less on a dry matter basis.

8. The method of producing a mung bean protein composition according to claim 1, wherein an iron content of the composition is 97 ppm or less on a dry matter basis.

9. The method of producing a mung bean protein composition according to claim 1, wherein a crude protein content in the composition is 60% by weight or more on a dry matter basis.

10. The method of producing a mung bean protein composition according to claim 1, wherein a crude protein content in the composition is 80% by weight or more on a dry matter basis.

* * * * *